(12) United States Patent
Gao et al.

(10) Patent No.: US 7,046,164 B2
(45) Date of Patent: May 16, 2006

(54) METHOD AND SYSTEM FOR WELL TELEMETRY

(75) Inventors: Li Gao, Missouri City, TX (US); Dinding Chen, Plano, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 317 days.

(21) Appl. No.: 10/785,299

(22) Filed: Feb. 24, 2004

(65) Prior Publication Data
US 2005/0184880 A1    Aug. 25, 2005

(51) Int. Cl.
*G01V 3/00* (2006.01)

(52) U.S. Cl. .............. 340/854.4; 333/342; 340/853.1; 73/152.01

(58) Field of Classification Search ............ 340/853.1, 340/854.4; 333/242, 236; 73/152.01
See application file for complete search history.

(56) References Cited

U.S. PATENT DOCUMENTS

| | | | |
|---|---|---|---|
| 2,848,696 A | 8/1958 | Miller | 333/95 |
| 3,905,010 A * | 9/1975 | Fitzpatrick | 340/854.4 |
| 4,066,987 A | 1/1978 | Moore et al. | 333/95 |
| 4,071,834 A | 1/1978 | Comte | 333/95 |
| 4,246,584 A | 1/1981 | Noerpel | 343/786 |
| 4,928,759 A * | 5/1990 | Siegfried et al. | 166/65.1 |
| 5,148,134 A | 9/1992 | Krill et al. | 333/242 |
| 5,202,650 A | 4/1993 | Krill et al. | 333/34 |
| 5,831,549 A | 11/1998 | Gearhart | 340/853.1 |
| 6,474,349 B1 * | 11/2002 | Laker | 134/22.12 |
| 6,719,068 B1 * | 4/2004 | Jonsson | 175/19 |

OTHER PUBLICATIONS

Paper entitled "Waveguide as a Communication Medium" by S.E. Miller, dated Mar. 1954.
"Microwave Engineering" by David M. Pozar, pp. 132-141, dated 1998.

* cited by examiner

*Primary Examiner*—Albert K. Wong
(74) *Attorney, Agent, or Firm*—John W. Wustenberg; Baker Botts, L.L.P.

(57) ABSTRACT

Methods and systems for borehole telemetry are disclosed. In one embodiment, a borehole telemetry system includes a coiled tubing string that is located in the borehole. A receiver is coupled to the coiled tubing string. In one possible implementation, the receiver is located inside the coiled tubing string. A transmitter is also coupled to the coiled tubing string. The transmitter generates signals guided for at least a portion of their path by the entire internal cross-section of the coiled tubing string to the receiver.

30 Claims, 3 Drawing Sheets

METHOD AND SYSTEM FOR WELL TELEMETRY

BACKGROUND

The present invention relates to the field of telemetry systems. In particular, the invention relates to a method and system for well telemetry.

Coiled tubing is used in conventional well operations to convey downhole tools such as perforating guns, bridge plugs, and packers and to fish for objects downhole. Each of these uses can benefit from accurate measurements made by instruments located at the downhole end of the coiled tubing. For example, a measurement of the depth of a downhole device can be provided in real-time by a Coiled Tubing Collar Locator (CTCL). The CTCL includes an electromagnetic casing collar locator to detect the signal disturbance of the magnetic field as the tool passes a casing collar. This is useful information because the depths of the casing collars are known. In order to communicate that event to the uphole portion of the coiled tubing string, the CTCL changes the pressure of a circulation fluid, such as water, by opening and closing a side port by means of a solenoid valve. After a delay that can be calculated, the change in pressure is measurable uphole indicating the depth of the downhole device. Due to the physical characteristics of the circulation fluid, the maximum rate of data that can be communicated by pressure changes is low. It is difficult, therefore, to transmit more complex measurements, for example, formation measurements, uphole. In addition, some wells do not employ circulation fluid, which disables the CTCL-to-surface communication method.

SUMMARY

In general, in one aspect, the invention features a system for borehole telemetry. The borehole telemetry system includes a coiled tubing string that is located in the borehole. A receiver is coupled to the coiled tubing string. In one possible implementation, the receiver is located inside the coiled tubing string. A transmitter is also coupled to the coiled tubing string. The transmitter generates signals guided for at least a portion of their path by the entire internal cross-section of the coiled tubing string to the receiver.

In general, in another aspect, the invention features a system for borehole telemetry. The borehole telemetry system includes a coiled tubing string that is substantially rotatably fixed in the borehole. A receiver is coupled to the coiled tubing string. In one possible implementation, the receiver is located inside the coiled tubing string. A transmitter is also coupled to the coiled tubing string. The transmitter generates signals guided for at least a portion of their path by the coiled tubing string to the receiver.

In general, in another aspect, the invention features a method for communicating in a borehole. Signals are generated at a transmitter that is coupled to a coiled tubing string in the borehole. The signals are transmitted for at least a portion of their path across in the entire internal cross-section of the coiled tubing string. The signals are received at a receiver coupled to the coiled tubing string.

DETAILED DESCRIPTION

Figure 1:
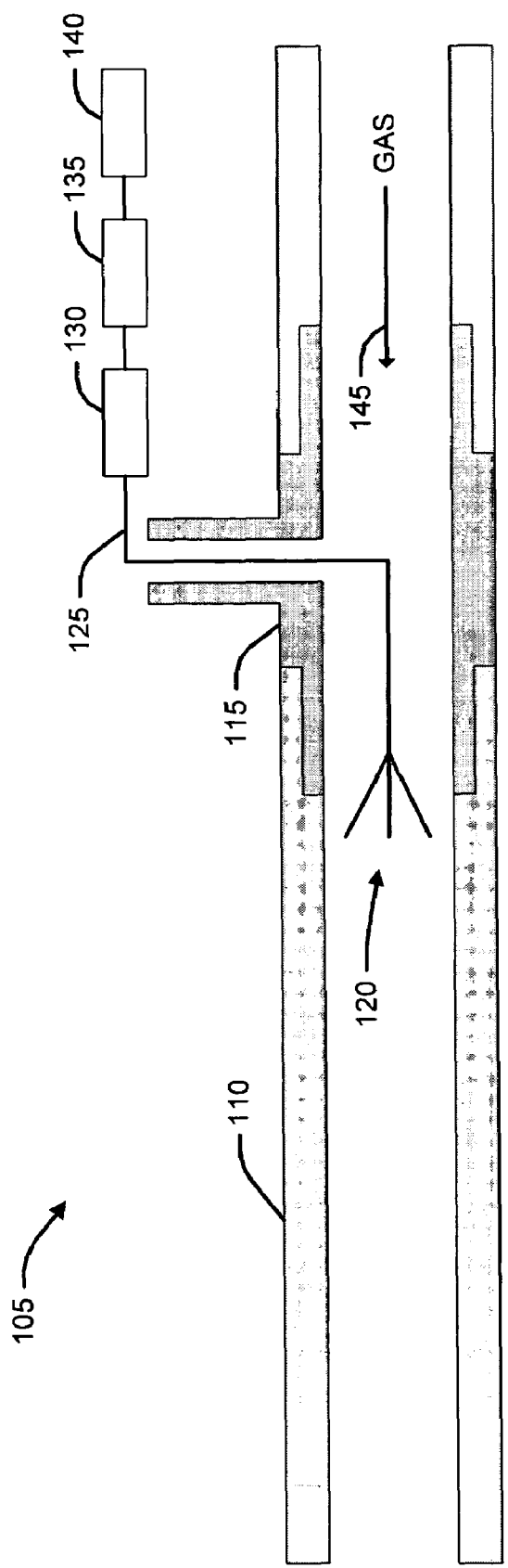
FIG. 1 is a diagram of an uphole portion of one system according to the invention.

The uphole portion 105 of a system for borehole telemetry is illustrated in FIG. 1. The uphole portion 105 functions together with the downhole portion 205 (shown in FIG. 2) to enable communications from a downhole device such as a sensor to an uphole location. The uphole and downhole portions 105 and 205 are connected by a coiled tubing string 110. In one embodiment, the coiled tubing string 110 is mounted in a rotatably fixed configuration relative to the borehole, as opposed to a rotational mounting, for example for drilling. The uphole portion 105 includes a receiver connector 115 coupled to the coiled tubing string 110. The receiver connector 115 couples the coiled tubing string 110 to a receiver 130 via an antenna 120 and a communications cable 125. The receiver 130 is coupled to a processor 135 that is coupled to electronic storage 140. In one embodiment, the processor 135 is part of a computer in a rigsite network and the electronic storage 140 is a hard drive accessible to that network.

In addition to the antenna 120, the receiver 130 can include a low-noise amplifier and a frequency down-converter to prepare the received signal for demodulation. The processor 135 can demodulate the signal provided by the receiver 130. The processor 135 can also filter and phase match the demodulated signal as required. The data represented by the signal can be stored in the electronic storage 140 and it can also be displayed, for example, on a monitor of the rigsite network. Instead or in addition to local display and storage, the data can be remotely transmitted by satellite or telecommunication methods.

In one embodiment the interior of the coiled tubing 110 is filled with air. In another embodiment, a gas such as nitrogen gas 145 is introduced to the coiled tubing string 110 interior. The coiled tubing string 110 can be a welded pipe manufactured in a tube mill from bias welded flat strips of low-alloy, high-strength carbon steel. In one embodiment, a high degree of smoothness on the internal wall of the coiled tubing string 110 assists in the transmission of electromagnetic waves. A different coiled tubing string 110 is composed of a continuous helical metal conductor with a lossy housing made of composite material. The extent to which electromagnetic waves are transmitted in particular modes can be affected by the materials of the coiled tubing string 110. For example, the composite material housing can reduce the portion of the electromagnetic wave energy transmitted in non-TE modes. The modes of transmission are discussed in more detail with respect to the transmitter of FIG. 2. In one embodiment, the coiled tubing string has an inner diameter of 2". In another embodiment, the inner diameter is 3".

Figure 2:
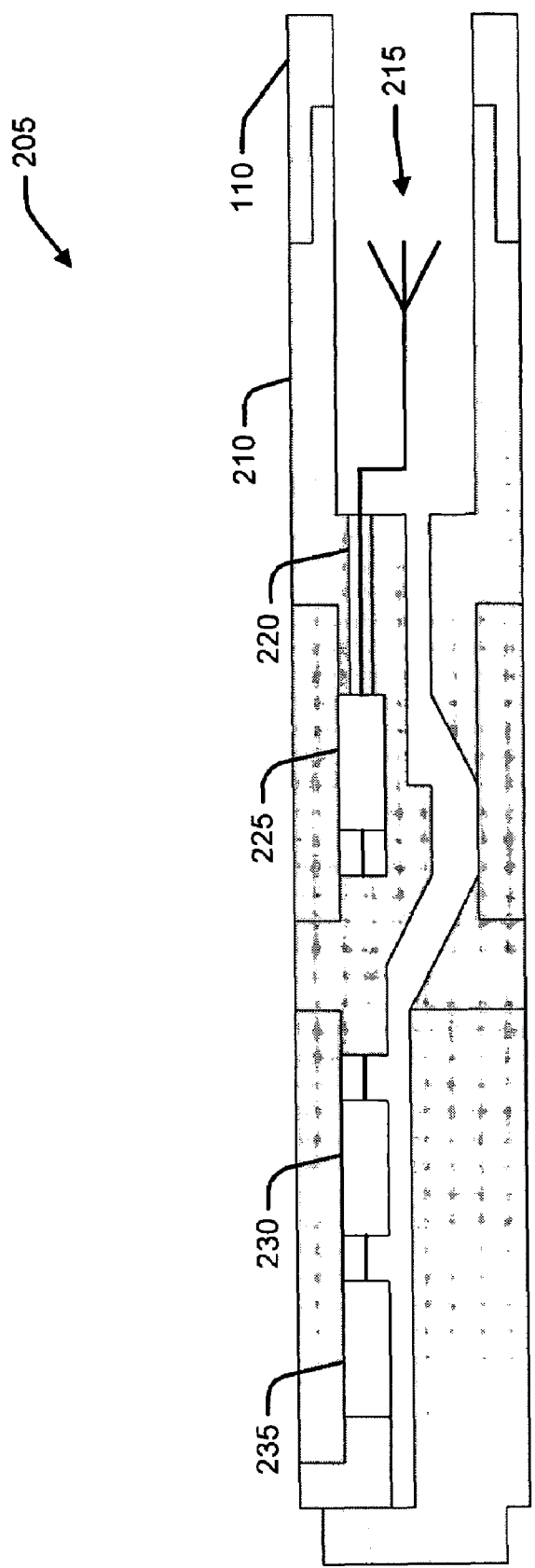
FIG. 2 is a diagram of a downhole portion of one system according to the invention.

FIG. 2 illustrates the downhole portion 205 of a system for borehole telemetry. The downhole portion 205 is coupled to the coiled tubing string 110. The downhole portion includes a tool 210 that houses a transmitter 225 that includes antenna 215. A coaxial insulator 220 protects a communications cable that connects the antenna 215 to other components of the transmitter 225. A sensor 235 takes measurements that are then represented by an electrical signal. The sensor 235 can be a CTCL or a device for measuring other parameters such as pressure and temperature. Coupled between the sensor 235 and transmitter 225 is a circuit board 230 that can also include a battery pack. The battery pack provides power to all the components. The circuit board 230 receives an electrical signal from the sensor 235 and converts that signal to a format that can be modulated on a microwave carrier. The newly formatted signal is communicated to the transmitter 225 that uses it to modulate a microwave carrier, e.g., a carrier in the 300 MHz to 300 GHz range. The transmitter 225 can include a frequency up-converter and a power amplifier as well as the antenna 215. Conductor losses are low at carrier frequencies of 5 GHz and 30 GHz and a frequency within that range is used in one embodiment.

In addition to the carrier frequency, the transmitter 225 also determines the balance of modes in which an electromagnetic wave is launched from the antenna 215. A launched signal will include components from transverse electric (TE) and transverse magnetic (TM) modes. In one embodiment, the transmitter 225 is configured to launch the signal predominately in TE01 or TE11 mode. TE01 mode requires higher carrier frequencies than TE11, but has the advantage of transmitting microwave signals over long distances with low loss. TE11 is the dominant TE mode and can be used with lower transmission frequencies. In one embodiment, the transmitter 225 is configured to launch the signal predominately in TE11 mode initially and in TE01 mode after a particular depth has been reached. In another embodiment, the transmitter mode is determined based on well characteristics before the transmitter 225 is inserted into the borehole.

Figure 3:
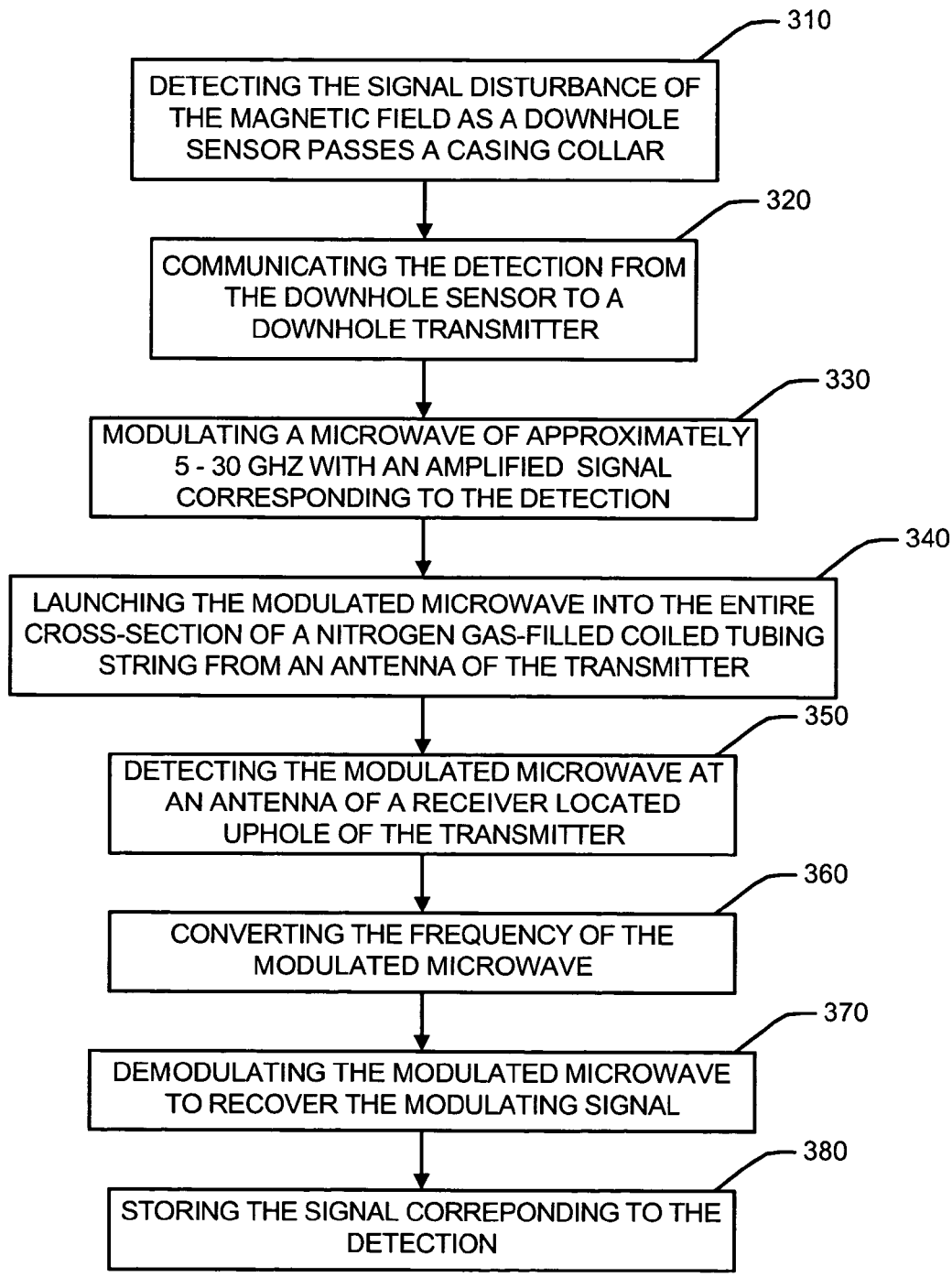
FIG. 3 is a flowchart of a method for communicating in a borehole.

FIG. 3 is a flowchart of a method for communicating in a borehole in one implementation of the invention. A sensor mounted on a coiled tubing string is lowered downhole. At 310, the sensor detects the signal disturbance of the magnetic field as it passes a casing collar. As discussed above, in different embodiments sensors that measure other parameters, including but not limited to pressure and temperature, can be used with the method. At 320, the detection of the casing collar is communicated by the sensor to a downhole transmitter that is also mounted on the coiled tubing string. At 330, the transmitter modulates a microwave signal having a frequency of approximately 5–30 GHz with an amplified signal that represents the detection of the casing collar. At 340, the transmitter antenna launches the modulated microwave into the entire cross-section of a nitrogen gas-filled coiled tubing string. As discussed above, the transmitter can be configured to launch the signal predominately in a particular mode, e.g., TE11 or TE01. At 350, the antenna of a receiver located uphole from the transmitter detects the modulated microwave that has traversed the coiled tubing string waveguide. At 360, the receiver converts the frequency of the detected microwave signal. At 370, a processor demodulates the microwave signal to generate the signal representing the detection of the casing collar. At 380, the signal corresponding to the detection of the casing collar is stored. In one embodiment, the signal is stored by calculating a depth based on the signal that is stored along with the time corresponding to that depth.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A borehole telemetry system comprising:
    a coiled tubing string for use in the borehole;
    a receiver coupled to the coiled tubing string; and
    a transmitter coupled to the coiled tubing string; wherein the transmitter generates signals guided for at least a portion of their path by the entire internal cross-section of a gas-filled section of the coiled tubing string to the receiver.

2. The borehole telemetry system of claim 1 wherein the receiver is located within the coiled tubing string.

3. The borehole telemetry system of claim 1 wherein the transmitter is located within the coiled tubing string.

4. The borehole telemetry system of claim 1 further comprising an instrument coupled to the transmitter.

5. The borehole telemetry system of claim 1 further comprising a storage device coupled to the receiver.

6. The borehole telemetry system of claim 1 wherein the signals comprise a modulated microwave signal.

7. The borehole telemetry system of claim 1 wherein the signals comprise a TE01 mode signal.

8. The borehole telemetry system of claim 1 wherein the signals comprise a TE11 mode signal.

9. The borehole telemetry system of claim 1 wherein the coiled tubing string contains nitrogen gas.

10. The borehole telemetry system of claim 1 wherein the coiled tubing string comprises a continuous helical metal conductor.

11. The borehole telemetry system of claim 1 wherein the coiled tubing string comprises a composite material housing.

12. A borehole telemetry system comprising:
    a coiled tubing string substantially rotatably fixed in the borehole;
    a receiver coupled to the coiled tubing string; and
    a transmitter coupled to the coiled tubing string;
    wherein the transmitter generates signals guided for at least a portion of their path by a gas-filled section of the coiled tubing string to the receiver.

13. The borehole telemetry system of claim 12 further comprising an antenna coupled to the receiver.

14. The borehole telemetry system of claim 12 further comprising an antenna coupled to the transmitter.

15. The borehole telemetry system of claim 12 further comprising an instrument coupled to the transmitter.

16. The borehole telemetry system of claim 12 further comprising a storage device coupled to the receiver.

17. The borehole telemetry system of claim 12 wherein the signals comprise a modulated microwave signal.

18. The borehole telemetry system of claim 12 wherein the signals comprise a TE01 mode signal.

19. The borehole telemetry system of claim 12 wherein the signals comprise a TE11 mode signal.

20. The borehole telemetry system of claim 12 wherein the coiled tubing string contains nitrogen gas.

21. The borehole telemetry system of claim 12 wherein the coiled tubing string comprises a continuous helical metal conductor.

22. The borehole telemetry system of claim 12 wherein the coiled tubing string comprises a composite material housing.

23. A method for communicating in a borehole, comprising the steps of:
    generating signals at a transmitter coupled to a coiled tubing string in the borehole;
    transmitting the signals in the entire internal cross-section of a gas-filled section of the coiled tubing string along at least a portion of their path; and
    receiving the signals at a receiver coupled to the coiled tubing string.

24. The method of claim 23 wherein the signals correspond to the proximity of a casing collar to a sensor.

25. The method of claim 23 further comprising the step of receiving signals from an instrument at the transmitter.

26. The method of claim 23 further comprising the step of amplifying the received signals.

27. The method of claim 23 further comprising the step of demodulating the received signals.

28. The method of claim 23 further comprising the step of converting the frequency of the received signals.

29. The method of claim 23 wherein the signals comprise a modulated carrier of approximately 5–30 GHz.

30. The method of claim 23 further comprising the step of injecting gas into the coiled tubing string.

* * * * *